United States Patent
Schmidt et al.

(10) Patent No.: US 12,263,902 B2
(45) Date of Patent: Apr. 1, 2025

(54) MOBILE TRANSPORT SYSTEM

(71) Applicant: SEW-EURODRIVE GMBH & CO. KG, Bruchsal (DE)

(72) Inventors: Josef Schmidt, Philippsburg-Huttenheim (DE); Andreas Tuskan, Walzbachtal (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 0 days.

(21) Appl. No.: 18/681,126

(22) PCT Filed: Jul. 5, 2022

(86) PCT No.: PCT/EP2022/068624
§ 371 (c)(1),
(2) Date: Feb. 5, 2024

(87) PCT Pub. No.: WO2023/011823
PCT Pub. Date: Feb. 9, 2023

(65) Prior Publication Data
US 2024/0278861 A1  Aug. 22, 2024

(30) Foreign Application Priority Data
Aug. 3, 2021  (DE) .......................... 102021003983.1

(51) Int. Cl.
*B62D 61/10* (2006.01)
*B60K 1/02* (2006.01)
*B62D 63/02* (2006.01)

(52) U.S. Cl.
CPC ................ *B62D 61/10* (2013.01); *B60K 1/02* (2013.01); *B62D 63/02* (2013.01)

(58) Field of Classification Search
CPC .......... B62D 61/10; B62D 63/02; B60K 1/02
See application file for complete search history.

(56) References Cited

U.S. PATENT DOCUMENTS

| | | | |
|---|---|---|---|
| 10,787,107 B2 | 9/2020 | Schmidt | |
| 2002/0124764 A1* | 9/2002 | Coveyou | B62D 61/12 180/6.2 |

(Continued)

FOREIGN PATENT DOCUMENTS

| | | | | |
|---|---|---|---|---|
| DE | 202004004972 U1 * | 8/2004 | ............. | B62B 3/008 |
| DE | 102006046406 B3 * | 2/2008 | ............... | A61G 5/06 |

(Continued)

OTHER PUBLICATIONS

DE-102006046406-B3 Machine English Translation (Year: 2008).*

(Continued)

*Primary Examiner* — Jason D Shanske
*Assistant Examiner* — Matthew James O'Neill
(74) *Attorney, Agent, or Firm* — Carter, DeLuca & Farrell LLP

(57) ABSTRACT

A mobile transport system for transporting objects, e.g., in a technical facility, includes a first drive module and a second drive module, which are offset relative to each other in a longitudinal direction, and a load-holding unit, which is supported on the drive modules. Each of the drive modules includes a module frame, a first caster, which is mounted for rotation about a first axis of rotation, a second caster, which is mounted for rotation about a second axis of rotation, a third caster, which is mounted for rotation about a third axis of rotation, a fourth caster, which is mounted for rotation about a fourth axis of rotation, and a drive unit. The drive unit includes a drive frame disposed on the module frame, a first drive wheel, which can be rotated about a first drive axis, and a second drive wheel, which can be rotated about a second drive axis, the first caster being disposed on a first load lever (21), which can be pivoted relative to the module frame about a load axis extending in a transverse direction, the second caster being disposed on a second load lever, (Continued)

which can be pivoted relative to the module frame about the load axis, the third caster being disposed on the module frame, the fourth caster (44) being disposed on the module frame. The load-carrying unit is supported, at a first support point, on the first load lever and, at a second support point, on the second load lever.

15 Claims, 3 Drawing Sheets

(56) References Cited

U.S. PATENT DOCUMENTS

2020/0114714 A1* 4/2020 Doan .................... B62D 61/10
2021/0171104 A1   6/2021 Xi

FOREIGN PATENT DOCUMENTS

DE    102016013645 A1   6/2017
EP         3281848 A1   2/2018

OTHER PUBLICATIONS

DE-202004004972-U1 Machine English Translation (Year: 2004).*
International Search Report issued in corresponding International Application No. PCT/EP2022/068624 dated Oct. 20, 2022, pp. 1-2, English Translation.
International Report on Patentability issued in corresponding International Application No. PCT/EP2022/068624, dated Feb. 6, 2024, pp. 1-7, English Translation.

* cited by examiner

MOBILE TRANSPORT SYSTEM

FIELD OF THE INVENTION

The present invention relates to a mobile transport system, e.g., for transporting objects, e.g., in a technical facility, including, for example, a drive module and a plurality of rotatably mounted casters.

BACKGROUND INFORMATION

In technical facilities, for example, in production plants, mobile transport systems, e.g., autonomous mobile transport systems, are used to transport objects such as small parts or crates. Among other things, these mobile transport systems bring components from logistics areas, such as a materials warehouse, to workplaces where the components are processed. Certain mobile transportation systems are capable of overcoming slight inclines or declines as well as small ground sills or similar obstacles.

A mobile transport system for transporting objects, e.g., in a technical facility, is described in German Patent Document No. 10 2020 002 676. The mobile transport system includes a drive unit and a plurality of rotatably mounted support wheels.

German Patent Document No. 10 2012 025 152 describes a driverless transport system which has casters, which are disposed on a support part, and a drive unit. The drive unit has a wheel driven by an electric motor and can be moved relative to the support part via a linear actuator.

A vehicle which has a frame on which several steering units are rotatably mounted is described in German Patent Document No. 10 2013 019 726. The steering units each have a drive wheel whose wheel axle is rotatably mounted in a wheel axle carrier, and the wheel axle carrier is rotatably mounted via a floating axle.

German Patent Document NO. 10 2014 015 317 describes a vehicle with a frame on which a receiving part is guided via a linear guide. The vehicle also includes a drive unit with drive wheels which are rotatably mounted on a swing arm via a pivot bearing.

A transport system is described in German Patent Document No. 10 2016 013 645. The transport system has a first mobile part and a second mobile part as well as a transport frame, and bearing rollers are disposed on the transport frame for moving the transport frame on a travel surface.

German Patent Document No. 10 2006 046 406 describes a vehicle including a chassis and a drive unit. The drive unit has two drive wheels. The vehicle also includes two front wheel units and two rear wheel units.

SUMMARY

Example embodiments of the present invention provide a mobile transportation system for transporting objects.

According to example embodiments, a mobile transport system for transporting objects, e.g., in a technical facility, includes a first drive module and a second drive module, which are offset relative to each other in a longitudinal direction, and a load-holding unit, which is supported on the drive modules. Each of the drive modules includes a module frame, a first caster, which is mounted for rotation about a first axis of rotation, a second caster, which is mounted for rotation about a second axis of rotation, a third caster, which is mounted for rotation about a third axis of rotation, a fourth caster, which is mounted for rotation about a fourth axis of rotation, and a drive unit. The drive unit has a drive frame disposed on the module frame, a first drive wheel which can be rotated about a first drive axis, and a second drive wheel which can be rotated about a second drive axis. The first caster is disposed on a first load lever, which can be pivoted relative to the module frame about a load axis extending in a transverse direction, the second caster is disposed on a second load lever, which can be pivoted relative to the module frame about the load axis, the third caster is disposed on the module frame, and the fourth caster is disposed on the module frame. The load-holding unit is supported at a first support point on the first load lever and at a second support point on the second load lever. The transverse direction extends at a right angle to the longitudinal direction. A vertical direction extends at a right angle to the longitudinal direction and at a right angle to the transverse direction.

For example, the mobile transport system has a modular configuration. Depending on the required application, different types of load-holding units can be combined with the drive modules. For example, the load-holding unit is arranged long and flat, i.e., it has a relatively large extension in the longitudinal direction and a relatively small extension in the vertical direction. For example, the load-holding unit is also arranged short and high, i.e., it has a relatively small extension in the longitudinal direction and a relatively large extension in the vertical direction. The extension of the load-holding unit in the transverse direction is also variable. The configuration of the mobile transport system described herein allows a weight force transferred to the drive modules by the load-holding unit to be distributed almost arbitrarily to the drive wheels and the casters. The configuration of the mobile transport system described herein also makes it possible to compensate for uneven ground.

For example, the drive frame can be pivoted relative to the module frame about a steering axis extending in a vertical direction. For example, the first caster can be pivoted relative to the first load lever about a first pivot axis extending in the vertical direction. For example, the second caster can be pivoted relative to the second load lever about a second pivot axis extending in the vertical direction. For example, the third caster can be pivoted relative to the module frame about a third pivot axis extending in the vertical direction. For example, the fourth caster can be pivoted relative to the module frame about a fourth pivot axis extending in the vertical direction. Casters arranged in this manner are relatively inexpensive and also make it easier for the mobile transport system to negotiate bends. A pivoting movement of the drive frame relative to the module frame also changes the alignment of the drive wheels relative to the module frame. This makes it possible to change the direction of movement of the mobile transport system.

According to example embodiments, the load axis is disposed in the longitudinal direction between the first pivot axis and the third pivot axis. According to example embodiments, the load axis is disposed in the longitudinal direction between the second pivot axis and the fourth pivot axis.

According to example embodiments, the first support point is disposed in the longitudinal direction between the first pivot axis and the load axis. According to example embodiments, the second support point is disposed in the longitudinal direction between the second pivot axis and the load axis.

According to example embodiments, a first distance of the load axis to the first support point in the longitudinal direction is at least approximately equal to a third distance of the load axis to the third pivot axis in the longitudinal direction. According to example embodiments, a second distance of the load axis to the second support point in the longitudinal direction is at least approximately equal to a fourth distance of the load axis to the fourth pivot axis in the longitudinal direction. This arrangement ensures an even load distribution on the third caster and the first drive wheel as well as an even load distribution on the fourth caster and the second drive wheel.

According to example embodiments, a fifth distance of the first support point to the first pivot axis in the longitudinal direction is at least approximately twice as large as a first distance of the first support point to the load axis in the longitudinal direction. According to example embodiments, a sixth distance of the second support point to the second pivot axis in the longitudinal direction is at least approximately twice as large as a second distance of the second support point to the load axis in the longitudinal direction. This arrangement ensures an even load distribution on the first caster and the first drive wheel as well as an even load distribution on the second caster and the second drive wheel.

According to example embodiments, the steering axis is disposed in the longitudinal direction between the first pivot axis and the load axis. According to example embodiments, the steering axis is disposed in the longitudinal direction between the second pivot axis and the load axis.

According to example embodiments, a seventh distance of the load axis to the steering axis in the longitudinal direction is at least approximately equal to a first distance of the load axis to the first support point in the longitudinal direction. According to example embodiments, a seventh distance of the load axis to the steering axis in the longitudinal direction is at least approximately equal to a second distance of the load axis to the second support point in the longitudinal direction. This arrangement ensures an even load distribution on the first caster and the third caster as well as an even load distribution on the second caster and the fourth caster.

According to example embodiments, a seventh distance of the load axis to the steering axis in the longitudinal direction is at least approximately equal to a third distance of the load axis to the third pivot axis in the longitudinal direction. According to example embodiments, a seventh distance of the load axis to the steering axis in the longitudinal direction is at least approximately equal to a fourth distance of the load axis to the fourth pivot axis in the longitudinal direction. This arrangement ensures an even load distribution on the first caster and the third caster as well as an even load distribution on the second caster and the fourth caster.

According to example embodiments, the steering axis is disposed in the transverse direction between the first pivot axis and the second pivot axis. According to example embodiments, the steering axis is disposed in the transverse direction between the third pivot axis and the fourth pivot axis. According to example embodiments, the steering axis is disposed in the transverse direction between the first support point and the second support point.

According to example embodiments, the axes of rotation of the casters and the drive axes of the drive wheels respectively extend in a horizontal direction. Horizontal directions extend at right angles to the vertical direction.

According to example embodiments, a braking device is disposed on at least one of the casters, via which a rotation of the respective caster about the respective axis of rotation can be braked. The braking devices can be actuated electromagnetically, for example. This means that the mobile transport system can be braked at any time, almost independently of the condition of the ground. Additional braking devices on the drive wheels are not required.

According to example embodiments, the first drive wheel is rotatably mounted on a first swing arm which can be pivoted about a first swing axis relative to the drive frame, and the second drive wheel is rotatably mounted on a second swing arm which can be pivoted about a second swing axis relative to the drive frame. The first swing arm and the second swing arm are coupled to each other via a coupling unit such that a pivoting movement of the first swing arm about the first swing axis in a first pivoting direction causes a pivoting movement of the second swing arm about the second swing axis in a second pivoting direction opposite to the first pivoting direction.

The pivoting movement of the swing arms about the swing axes when driving over uneven ground ensures that both drive wheels are always in contact with the ground and have a sufficiently high contact pressure. It is not necessary to use springs to achieve a sufficiently high contact pressure between the drive wheels and the ground. The mobile transport system has rigid kinematics that prevent it from yielding or deflecting when driving over uneven ground. More particularly, the first drive axis and the second drive axis can be displaced relative to each other. The first drive axis and the second drive axis always extend parallel to each other. Such a displacement of the drive axes relative to each other occurs during a pivoting movement of the swing arms about the swing axes. This prevents the drive wheels from jamming when the swing arms pivot about the swing axes. When the swing arms are aligned in a certain manner, the drive axes align with each other. More particularly, the first swing axis and the second swing axis are aligned with each other. The swing axes therefore extend parallel to each other and parallel to the drive axes. A pivoting movement of the swing arms about the swing axes thus causes a displacement of one of the drive axes towards the ground and a movement of the other drive axis away from the ground.

According to example embodiments, the drive unit has a first drive motor for driving the first drive wheel and a second drive motor for driving the second drive wheel. More particularly, the first drive motor is disposed on the first swing arm, and the second drive motor is disposed on the second swing arm. For example, gears are also provided via which the drive motors drive the drive wheels. The gears are also disposed on the swing arms. The drive motors and gears are thus disposed in an installation space between the drive wheels. For example, the mobile transport system also has an electrical energy storage unit to supply the drive motors.

Further features and aspects of example embodiments of the present invention are explained in more detail below with reference to the appended schematic Figures.

DETAILED DESCRIPTION

Figure 1:
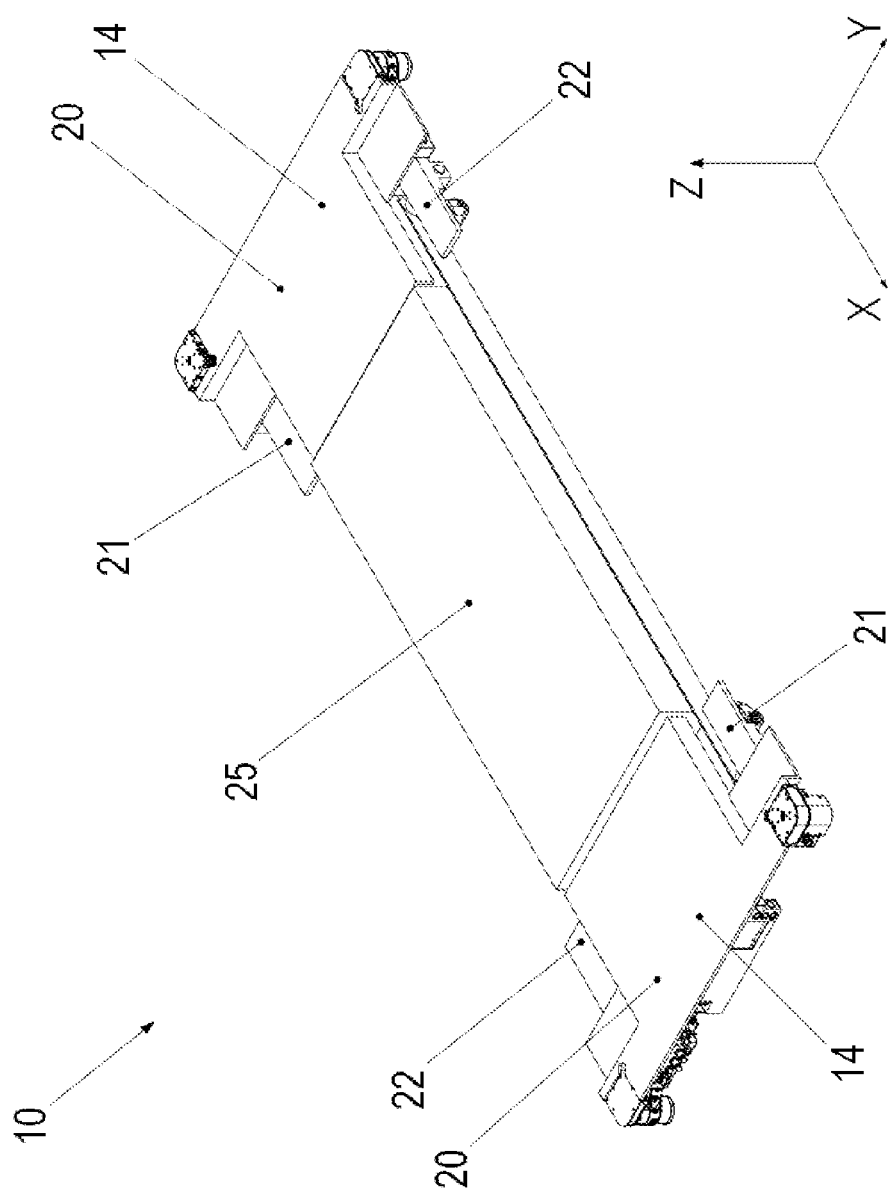
FIG. 1 is a perspective view of a mobile transportation system.

FIG. 1 is a perspective view of a mobile transportation system 10. The mobile transport system 10 is used to transport objects within a technical facility. The technical facility is, for example, an industrial application, for example, a production plant. For example, the mobile transport system 10 is an autonomous driving vehicle. As illustrated, the mobile transport system 10 is located on a flat ground within a technical facility.

The mobile transport system 10 includes a first drive module 20 and a second drive module 20. The drive modules 20 are offset relative to each other in a longitudinal direction X. The mobile transport system 10 also includes a load-holding unit 25, which is supported on the drive modules 20. The load-holding unit 25 is used to hold objects to be transported.

The longitudinal direction X corresponds at least approximately to the usual direction of travel of the mobile transport system 10. A transverse direction Y extends at a right angle to the longitudinal direction X. The longitudinal direction X and the transverse direction Y represent horizontal directions and extend parallel to the flat ground on which the mobile transport system 10 is located. A vertical direction Z is perpendicular to the flat ground and thus extends at a right angle to the longitudinal direction X and at a right angle to the transverse direction Y. Each direction at a right angle to the vertical direction Z represents a horizontal direction.

Each of the drive modules 20 includes a module frame 14. Each of the drive modules 20 further includes a first load lever 21 and a load lever 22. The load-holding unit 25 is supported on the load levers 21, 22 of the drive modules 20.

Figure 2:
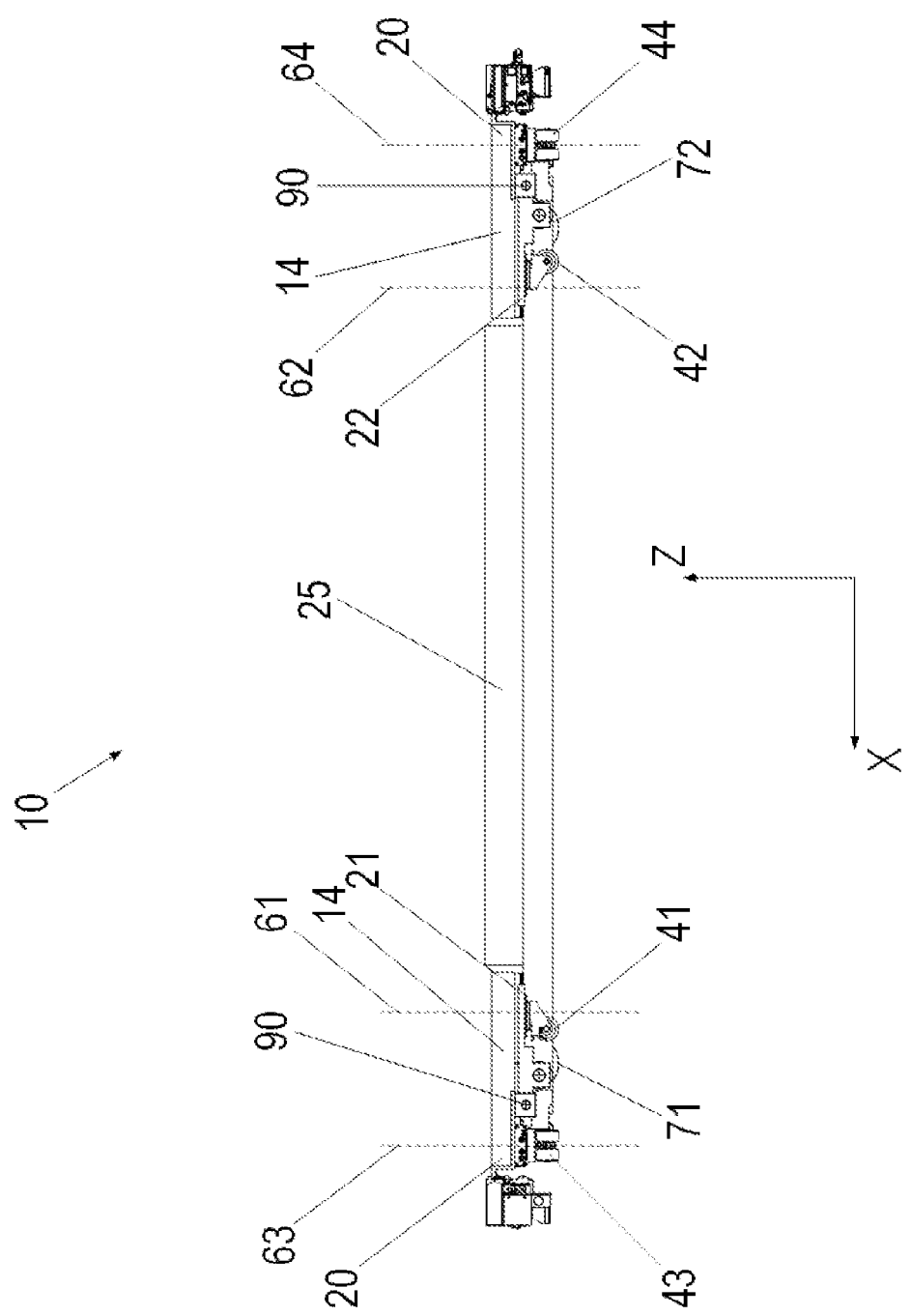
FIG. 2 is a side view of a mobile transportation system.

FIG. 2 is a side view of a mobile transport system 10. Each of the drive modules 20 includes a first caster 41, which is mounted for rotation about a first axis of rotation, a second caster 42, which is mounted for rotation about a second axis of rotation, a third caster 43, which is mounted for rotation about a third axis of rotation, and a fourth caster 44, which is mounted for rotation about a fourth axis of rotation. As illustrated, respectively one of the casters 41, 42, 43, 44 is covered by another caster 41, 42, 43, 44.

The first caster 41 is respectively disposed on the first load lever 21. The second caster 42 is respectively disposed on the second load lever 22. The load levers 21, 22 can be pivoted relative to the respective module frame 14 about a load axis 90 extending in the transverse direction Y. The third caster 43 is respectively disposed on the module frame 14, and the fourth caster 44 is respectively disposed on the module frame 14.

The first caster 41 can be respectively pivoted relative to the first load lever 21 about a first pivot axis 61 extending in the vertical direction Z. The second caster 42 can be respectively pivoted relative to the second load lever 22 about a second pivot axis 62 extending in the vertical direction Z. The third caster 43 can be respectively pivoted relative to the module frame 14 about a third pivot axis 63 extending in the vertical direction Z. The fourth caster 44 can be respectively pivoted relative to the module frame 14 about a fourth pivot axis 64 extending in the vertical direction Z.

The axes of rotation of the casters 41, 42, 43, 44 respectively extend in a horizontal direction. Depending on the pivoting of the casters 41, 42, 43, 44 about the respective pivot axis 61, 62, 63, 64, the pivot axes extend, for example, in the longitudinal direction X or in the transverse direction Y or in another horizontal direction. The pivot axis 61, 62, 63, 64 and the axis of rotation of an individual caster 41, 42, 43, 44 do not intersect, for example.

Figure 3:
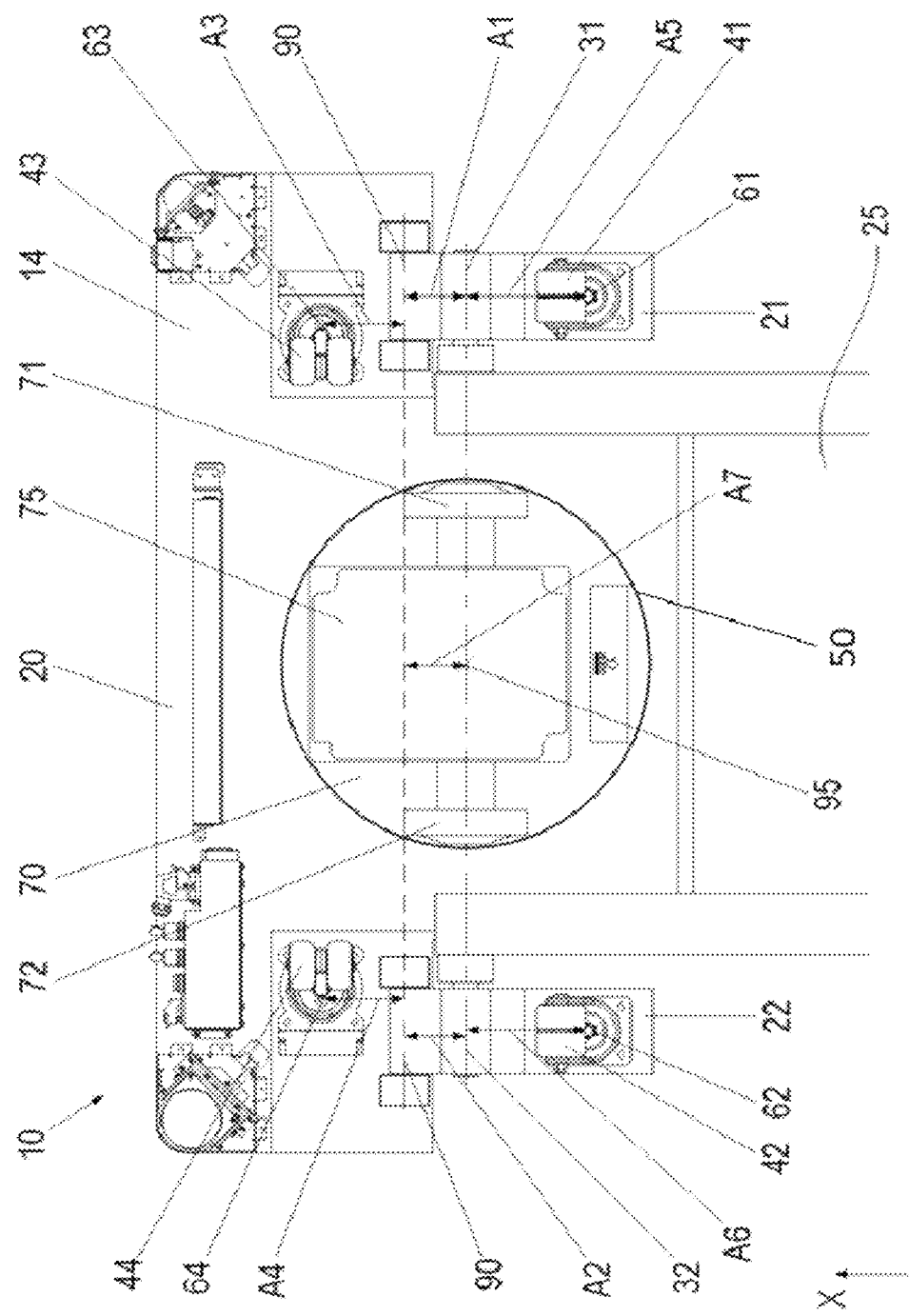
FIG. 3 is a view of part of the underside of a mobile transportation system.

FIG. 3 is a view of part of the underside of a mobile transportation system 10. Only one of the two drive modules 20 and part of the load-holding unit 25 is illustrated. The drive module 20 includes a drive unit 70. The drive unit 70 has a transmitter head 75 disposed on the module frame 14. The transmitter head 75 is used for the inductive absorption of energy.

The drive unit 70 also has a drive frame 50, which is disposed on the module frame 14. The drive frame 50 can be pivoted relative to the module frame 14 about a steering axis 95 extending in the vertical direction Z. The drive unit 70 has a first drive wheel 71 which can be rotated about a first drive axis and a second drive wheel 72 which can be rotated about a second drive axis. The drive axes of the drive wheels 71, 72 respectively extend in a horizontal direction. Depending on a pivoting of the drive frame 50 about the steering axis 95, the drive axes extend, for example, in longitudinal direction X or in transverse direction Y or in another horizontal direction.

The load-holding unit 25 is supported at a first support point 31 on the first load lever 21. The load-holding unit 25 is supported at a second support point 32 on the second load lever 22. The load levers 21, 22 are each mounted in a bearing on the module frame 14. The load axis 90, about which the load levers 21, 22 can pivot, extends in the transverse direction Y through the bearings.

The steering axis 95 is disposed in the transverse direction Y between the first pivot axis 61 of the first caster 41 and the second pivot axis 62 of the second caster 42. The steering axis 95 is disposed in transverse direction Y between the third pivot axis 63 of the third caster 43 and the fourth pivot axis 64 of the fourth caster 44. The steering axis 95 is further disposed in the transverse direction Y between the first support point 31 and the second support point 32.

The load axis 90 is disposed in the longitudinal direction X between the first pivot axis 61 and the third pivot axis 63. The load axis 90 is disposed in the longitudinal direction X between the second pivot axis 62 and the fourth pivot axis 64. The load axis 90 is disposed in the longitudinal direction X between the first support point 31 and the third pivot axis 63. The load axis 90 is disposed in the longitudinal direction X between the second support point 32 and the fourth pivot axis 64.

The first support point 31 is disposed in the longitudinal direction X between the first pivot axis 61 and the third pivot axis 63. The second support point 32 is disposed in the longitudinal direction X between the second pivot axis 62 and the fourth pivot axis 64. The first support point 31 is disposed in the longitudinal direction X between the first pivot axis 61 and the load axis 90. The second support point 32 is disposed in the longitudinal direction X between the second pivot axis 62 and the load axis 90.

The steering axis 95 is disposed in the longitudinal direction X between the first pivot axis 61 and the third pivot axis 63. The steering axis 95 is disposed in the longitudinal direction X between the second pivot axis 62 and the fourth pivot axis 64. The steering axis 95 is disposed in the longitudinal direction X between the first pivot axis 61 and the load axis 90. The steering axis 95 is disposed in the longitudinal direction X between the second pivot axis 62 and the load axis 90.

A first distance A1 of the load axis 90 to the first support point 31 in the longitudinal direction X is at least approximately equal to a third distance A3 of the load axis 90 to the third pivot axis 63 in the longitudinal direction X. A second distance A2 of the load axis 90 to the second support point 32 in the longitudinal direction X is at least approximately equal to a fourth distance A4 of the load axis 90 to the fourth pivot axis 64 in the longitudinal direction X.

A fifth distance A5 of the first support point 31 to the first pivot axis 61 in the longitudinal direction X is at least approximately twice as large as the first distance A1 of the first support point 31 to the load axis 90 in the longitudinal direction X. A sixth distance A6 of the second support point 32 to the second pivot axis 62 in the longitudinal direction X is at least approximately twice as large as the second distance A2 of the second support point 32 to the load axis 90 in the longitudinal direction X.

A seventh distance A7 of the load axis 90 to the steering axis 95 in the longitudinal direction X is at least approximately equal to the first distance A1 of the load axis 90 to the first support point 31 in the longitudinal direction X. The seventh distance A7 of the load axis 90 to the steering axis 95 in the longitudinal direction X is at least approximately equal to the second distance A2 of the load axis 90 to the second support point 32 in the longitudinal direction X.

The seventh distance A7 of the load axis 90 to the steering axis 95 in the longitudinal direction X is at least approximately equal to the third distance A3 of the load axis 90 to the third pivot axis 63 in the longitudinal direction X. The seventh distance A7 of the load axis 90 to the steering axis 95 in the longitudinal direction X is at least approximately equal to the fourth distance A4 of the load axis 90 to the fourth pivot axis 64 in the longitudinal direction X.

The drive unit 70 includes a first swing arm, which can be pivoted about a first swing axis relative to the drive frame, and a second swing arm, which can be pivoted about a second swing axis relative to the drive frame. The first swing axis and the second swing axis extend in a horizontal direction and are aligned with each other. The two swing arms can respectively be pivoted in a first pivoting direction and in a second pivoting direction opposite to the first pivoting direction about the swing axes relative to the drive frame.

The first drive wheel 71 is mounted on the first swing arm to be rotated about the first drive axis. The second drive wheel 72 is mounted on the second swing arm to be rotated about the second drive axis. The drive axes extend parallel to the swing axes, but are offset parallel to them. The drive axes can be displaced relative to each other by pivoting movements of the swing arms abound the swing axes.

The drive unit 70 includes a coupling unit which has a rocker which can be pivoted about a coupling axis relative to the drive frame, a first strut, and a second strut. The first swing arm is connected to the rocker via the first strut. The second swing arm is connected to the rocker via the second strut. The coupling axis extends in a horizontal direction. The first swing arm and the second swing arm are coupled to each other via the coupling unit.

If, for example, the first drive wheel 71 drives onto a ground elevation, the first drive wheel 71 is moved upwards in the vertical direction Z as a result. This causes the first swing arm to pivot about the first swing axis in the first pivoting direction. The first swing arm thus causes, via the first strut, a pivoting movement of the rocker about the coupling axis. The rocker thus causes, via the second strut, a pivoting movement of the second swing arm about the second swing axis in the second pivoting direction. This moves the second drive wheel downwards in the vertical direction Z.

The invention claimed is:

1. A mobile transport system for transporting objects, comprising:
    a first drive module;
    a second drive module offset from the first drive module in a longitudinal direction; and
    a load-carrying unit supported on the first drive module and the second drive module;
    wherein each of the first drive module and the second drive module includes:
        a respective module frame;
        a first caster adapted to rotate about a first axis of rotation and arranged on a first load lever adapted to pivot relative to the respective module frame about a load axis that extends in a transverse direction;
        a second caster adapted to rotate about a second axis of rotation and arranged on a second load lever adapted to pivot relative to the respective module frame about the load axis;
        a third caster adapted to rotate about a third axis of rotation and arranged on the respective module frame;
        a fourth caster adapted to rotate about a fourth axis of rotation and arranged on the respective module frame; and
        a drive unit including a drive frame arranged on the respective module frame, a first drive wheel adapted to rotate about a first drive axis, and a second drive wheel adapted to rotate about a second drive axis; and
    wherein the load-carrying unit is supported at a first support point on the first load lever and at a second support point on the second load lever.

2. The mobile transport system according to claim 1, wherein the mobile transport system is adapted to transport objects in a technical facility.

3. The mobile transport system according to claim 1, wherein the drive frame is adapted to pivot relative to the respective module frame about a steering axis extending in a vertical direction, the first caster is adapted to pivoted relative to the first load lever about a first pivot axis extending in the vertical direction, the second caster is adapted to pivot relative to the second load lever about a second pivot axis extending in the vertical direction, the third caster is adapted to pivot relative to the respective module frame about a third pivot axis extending in the vertical direction, and/or the fourth caster is adapted to pivot relative to the respective module frame about a fourth pivot axis extending in the vertical direction.

4. The mobile transport system according to claim 3, wherein the load axis is arranged in the longitudinal direction between the first pivot axis and the third pivot axis, and/or the load axis is arranged in the longitudinal direction between the second pivot axis and the fourth pivot axis.

5. The mobile transport system according to claim 3, wherein the first support point is arranged in the longitudinal direction between the first pivot axis and the load axis, and/or the second support point is arranged in the longitudinal direction between the second pivot axis and the load axis.

6. The mobile transport system according to claim 3, wherein a first distance of the load axis to the first support point in the longitudinal direction is at least approximately equal to a third distance of the load axis to the third pivot axis in the longitudinal direction, and/or a second distance of the load axis to the second support point in the longitudinal direction is at least approximately equal to a fourth distance of the load axis to the fourth pivot axis in the longitudinal direction.

7. The mobile transport system according to claim 3, wherein a fifth distance of the first support point to the first pivot axis in the longitudinal direction is at least approximately twice as large as a first distance of the first support point to the load axis in the longitudinal direction, and/or a sixth distance of the second support point to the second pivot axis in the longitudinal direction is at least approximately twice as large as a second distance of the second support point to the load axis in the longitudinal direction.

8. The mobile transport system according to claim 3, wherein the steering axis is arranged in the longitudinal direction between the first pivot axis and the load axis, and/or the steering axis is arranged in the longitudinal direction between the second pivot axis and the load axis.

9. The mobile transport system according to claim 3, wherein a seventh distance of the load axis to the steering axis in the longitudinal direction is at least approximately equal to a first distance of the load axis to the first support point in the longitudinal direction, and/or a seventh distance of the load axis to the steering axis in the longitudinal direction is at least approximately equal to a second distance of the load axis to the second support point in the longitudinal direction.

10. The mobile transport system according to claim 3, wherein a seventh distance of the load axis to the steering axis in the longitudinal direction is at least approximately equal to a third distance of the load axis to the third pivot axis in the longitudinal direction, and/or a seventh distance of the load axis to the steering axis in the longitudinal direction is at least approximately equal to a fourth distance of the load axis to the fourth pivot axis in the longitudinal direction.

11. The mobile transport system according to claim 3, wherein the steering axis is arranged in the transverse direction between the first pivot axis and the second pivot axis, the steering axis is arranged in the transverse direction between the third pivot axis and the fourth pivot axis, and/or the steering axis is arranged in the transverse direction between the first support point and the second support point.

12. The mobile transport system according to claim 1, wherein the axes of rotation and the drive axes extend in a horizontal direction.

13. The mobile transport system according to claim 1, wherein a brake is arranged on at least one of the casters adapted to brake a rotation of the caster about a corresponding axis of rotation.

14. The mobile transport system according to claim 1, wherein the first drive wheel is rotatably mounted on a first swing arm that is adapted to pivot about a first swing axis relative to the drive frame, the second drive wheel is rotatably mounted on a second swing arm adapted to pivot about a second swing axis relative to the drive frame, and a pivoting movement of the first swing arm about the first swing axis in a first pivoting direction causes a pivoting movement of the second swing arm about the second swing axis in a second pivoting direction opposite to the first pivoting direction.

15. The mobile transport system according to claim 1, wherein the drive unit includes a first drive motor adapted to drive the first drive wheel and a second drive motor adapted to drive the second drive wheel.

* * * * *